United States Patent [19]

Schroeder

[11] 4,358,965
[45] Nov. 16, 1982

[54] TRANSMISSION NEUTRAL LEVER LOCK

[75] Inventor: William L. Schroeder, Buffalo Grove, Ill.

[73] Assignee: International Harvester Co., Chicago, Ill.

[21] Appl. No.: 217,634

[22] Filed: Dec. 18, 1980

[51] Int. Cl.³ .............................................. G05G 5/10
[52] U.S. Cl. .................................... 74/475; 74/483 R; 180/271
[58] Field of Search ............. 74/475, 483 R; 180/271, 180/336; 70/193

[56] References Cited

U.S. PATENT DOCUMENTS

| | | | |
|---|---|---|---|
| 1,126,781 | 2/1915 | Kehoe | 70/193 |
| 3,285,361 | 11/1966 | Baker | 180/271 |
| 3,523,588 | 8/1970 | Bradshaw | 74/475 X |
| 3,811,020 | 5/1974 | Johnson et al. | 180/271 X |
| 4,069,900 | 1/1978 | Stamate | 180/271 X |
| 4,297,914 | 11/1981 | Klem et al. | 74/475 X |

Primary Examiner—Allan D. Herrmann
Attorney, Agent, or Firm—D. K. Sullivan; F. D. Au Buchon

[57] ABSTRACT

A transmission neutral lever lock is used to lock a transmission direction control lever in a neutral position by swinging a latch into a camming detent connected on a bearing sleeve which supports the transmission direction control lever.

3 Claims, 6 Drawing Figures

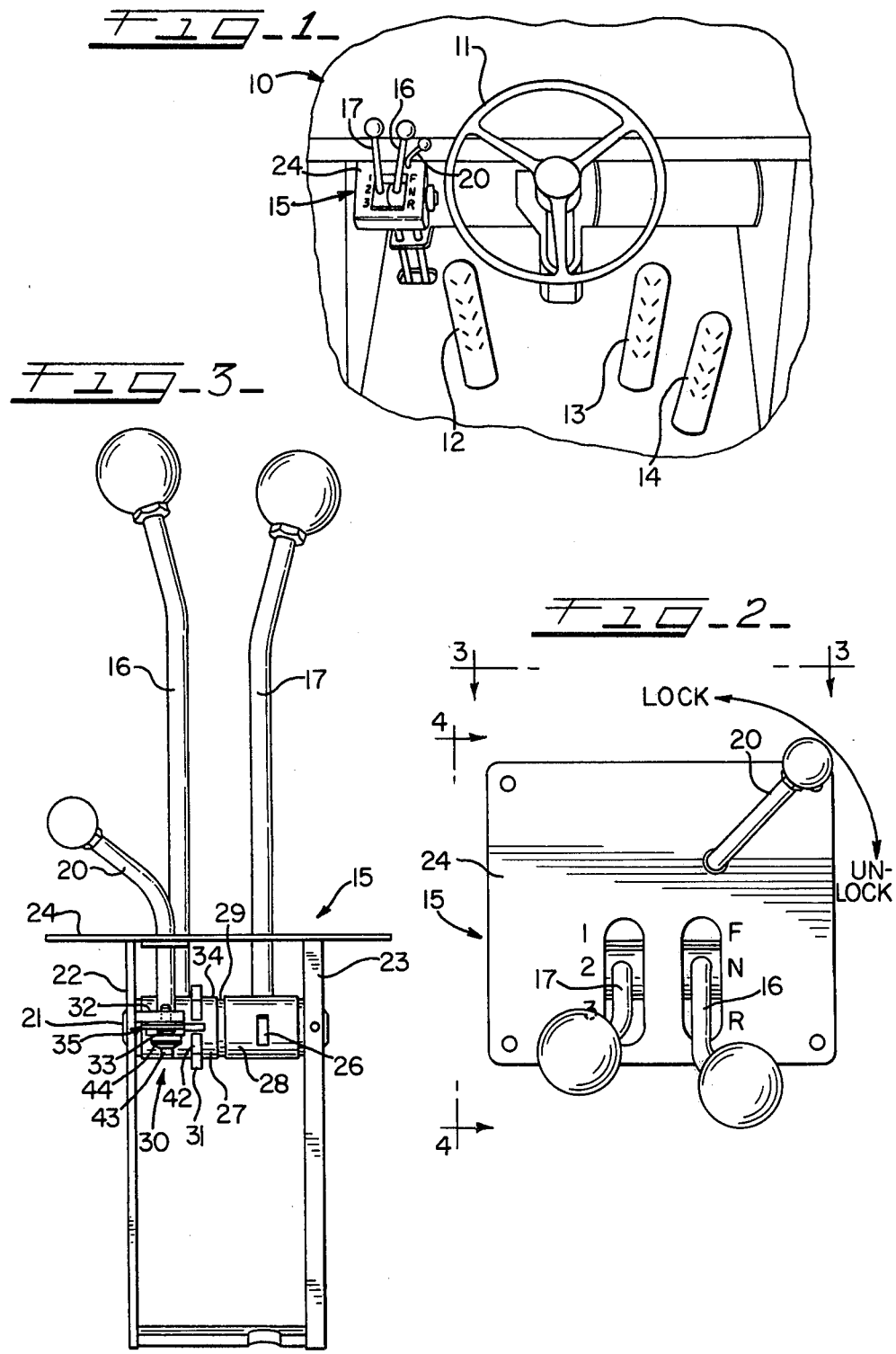

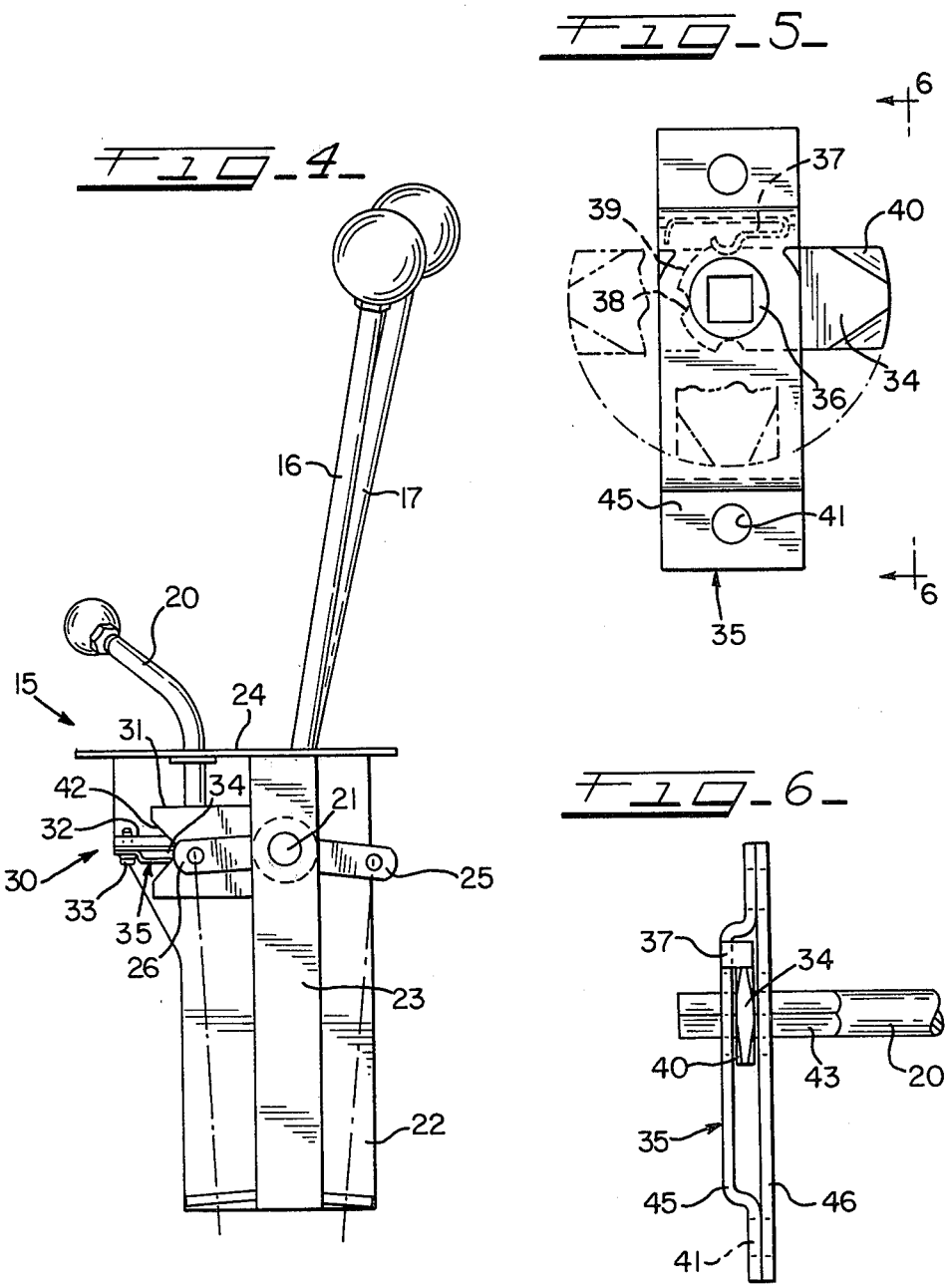

TRANSMISSION NEUTRAL LEVER LOCK

This invention relates to tractor loader vehicle transmission control levers, and in particular to a locking lever which is used to lock at least one transmission control lever in a neutral position.

Rubber tired tractor loader vehicles usually have two transmission control levers. One lever controls the transmission gear range while the other lever controls the direction of travel. In prior art arrangements, a flip hinge, which has a cut out portion, is used to lock the transmission direction control lever in the neutral position. In order to shift out of the neutral position, the operator must move the hinge plate upward allowing the lever to move freely. The disadvantage with this arrangement is that the hinge is a special stock part. I have found that a lock which is used for locking panels, can also be used for locking the transmission direction control lever in the neutral position.

The various figures in the accompanying drawing illustrate a suitable arrangement for a constructive practice of my invention, wherein:

FIG. 1 is a view of an operator's compartment of a rubber tired tractor loader vehicle showing the transmission gear range and direction control levers in combination with the transmission neutral lever lock of this invention;

FIG. 2 is a top view of the transmission control levers and the locking lever;

FIG. 3 is a view taken in a direction of arrows 3—3 in FIG. 2;

FIG. 4 is a view taken in a direction of arrows 4—4 in FIG. 2;

FIG. 5 is a bottom view of a panel lock; and

FIG. 6 is a view taken in a direction of arrows 6—6 in FIG. 5.

With reference now to the various figures of the drawing, wherein similar numerals refer to similar parts in the several views, and with particular reference to FIG. 1 there is shown an operator's cab 10 of a rubber tired tractor loader vehicle. Within the operator's cab 10 there is a steering wheel 11, a transmission disconnect brake pedal 12, a brake pedal 13, and an accelerator pedal 14. A transmission control lever housing 15 is located on the left side of the operator's cab 10. A transmission direction control lever 16 is swingable fore and aft, from a central neutral position N, to a forward directional travel position F and to a rearward direction of travel position R. Adjacent the transmission direction control lever 16, is a transmission gear range selector lever 17, which is swingable from an extreme forward first speed position 1 to an extreme rearward fast speed position 3, with an intermediate speed position 2 therebetween. A transmission neutral locking lever 20 is provided for the transmission direction control lever 16 which upon swinging in a counter-clockwise direction locks the transmission direction control lever 16 into the neutral N or central position.

Referring now to FIGS. 2, 3 and 4, the transmission control lever housing 15 supports a shaft 21 between side walls 22 and 23. A plate 24 covers the upper portion of the transmission control lever housing 15 and is provided with apertures through which the levers 16, 17 and 20 extend. A control arm 25 extends in a rearwardly direction from the direction control lever 16, and a forwardly extending control arm 26 extends from the gear range lever 17. The control arms 25 and 26 are fixed respectively to sleeves 27 and 28, which are journalled on the transverse shaft 21. On the diametrically opposite side of arm 25, which is on sleeve 27, a camming detent 31 is provided, which is engagable with latch 34 of the locking means 30. The sleeves 27 and 28 are axially spaced apart by a washer or spacer 29.

With reference to FIGS. 5 and 6, in conjunction with FIGS. 3 and 4, the locking means 30 comprise the camming detent 31 and a panel lock means 35. The panel lock means 35 comprise a generally rectangular shaped housing which has a bracket shaped shell 45 connected to a flat shell 46. The latch 34 is sandwiched inbetween the shell halves 45 and 46 and carries a square drive socket 36 which is journally mounted in bearing aperatures provided for this purpose in the shell halves 45 and 46. The latch 34 is provided with a rounded, semi-circular end 39 which carries three identical detent notches 38 on three quadrants of the semi-circular end. Spring 37 engages in and seats in one of the index notches 38 at one quadrant and holds the latch 34 in place. The latch 34 is provided with camming edge means 40, which cooperate with the V-notch 42 in the detent cam means 31, which is connected to sleeve 27.

The transmission neutral locking lever 20 as shown in FIG. 3 is provided with a square drive end 43 which engages with the socket drive 36, and is held in place by fastening means 44, which may be a spring steel nut. The panel lock means 35 is fastened to a plate 32 which is carried on side wall 22. Fastening means 33, which may be sheet metal screws, pass through openings 41 provided in the housing shell halves 45 and 46, and secure the panel lock means 35 to the plate 32.

In order to unlock the transmission direction control lever 16, the transmission neutral locking lever 20 is swung in a clockwise direction, pivoting the latch 34 out of engagement with the camming detent 31 and into confinement within the space between the shell halves 45 and 46. Spring 37 now engages with a second notch 38, which is on a quadrant laying on the longitudinal axis of the latch 34, and holds the latch within the confines of the shell halves 45 and 46. In order to lock the transmission direction control lever 16 in the central neutral position N, the transmission neutral locking lever 20 is rotated in a counterclockwise direction. The spring 37 now re-engages with the first notch 38, which is 90° from the second notch 38, and holds the latch within the V-notch 42 in the detent 31. As the latch 34 is pivoted into the V-notch 42, the camming surfaces 40 on the lateral thereof engage with the V-notch and guide the direction control lever 16 into the central neutral N position.

What is claimed is:

1. In a tractor loader vehicle, a housing having a slotted cover plate; at least two transmission control levers journally mounted on a horizontal shaft supported within said housing, said levers extending upwardly through said slotted cover plate, one of said levers controlling forward and rearward direction of travel of said vehicle and the other controlling the gear speed range; a slotted cam means mounted on the direction control lever; a panel lock means mounted within said housing and having a latch swingable about a vertical axis between the first disengaged position and a second position engaging said slotted cam means to lock the position of said direction control lever in a central neutral position and detent means associated with said latch for maintaining said latch in said second position; and a neutral locking lever having a vertical shaft portion disposed on the axis of rotation of said latch and drivingly coupled therewith to rotate said latch, said vertical shaft portion extending through an aperture in said housing cover plate to an integral radially extending hand lever portion having a length providing sufficient mechanical advantage for an operator to overcome said detent means and accomplish shifting of said latch between said first and second positions.

2. The invention according to claim 1 wherein the latch is provided with camming lateral edge surfaces cooperating with the cam means and guiding the direction control lever into the central neutral position simultaneously with locking the direction control lever in the central neutral position.

3. The invention according to claim 2 wherein the depending end of the neutral locking lever is provided with a square drive engagable with a square drive socket connected to the latching means.

* * * * *